(12) United States Patent
Stimpson et al.

(10) Patent No.: US 11,110,970 B2
(45) Date of Patent: Sep. 7, 2021

(54) REMOVABLE INTERIOR FOR RECONFIGURABLE VEHICLES

(71) Applicant: Great Wall Motor Company Limited, Baoding (CN)

(72) Inventors: Alexander Stimpson, West Bloomfield, MI (US); Dereck Wonnacott, Auburn Hills, MI (US); Mark Crawford, Van Buren Township, MI (US)

(73) Assignee: Great Wall Motor Company Limited, Baoding (CN)

( * ) Notice: Subject to any disclaimer, the term of this patent is extended or adjusted under 35 U.S.C. 154(b) by 104 days.

(21) Appl. No.: 16/710,102

(22) Filed: Dec. 11, 2019

(65) Prior Publication Data

US 2021/0078643 A1 Mar. 18, 2021

Related U.S. Application Data

(60) Provisional application No. 62/900,761, filed on Sep. 16, 2019.

(51) Int. Cl.
| | | |
|---|---|---|
| *B62D 31/02* | (2006.01) | |
| *B62D 25/20* | (2006.01) | |
| *B60P 3/42* | (2006.01) | |
| *E05B 59/00* | (2006.01) | |
| *G05D 1/02* | (2020.01) | |

(52) U.S. Cl.
CPC .............. *B62D 31/025* (2013.01); *B60P 3/42* (2013.01); *B62D 25/2054* (2013.01); *E05B 59/00* (2013.01); *G05D 1/0287* (2013.01)

(58) Field of Classification Search
CPC ...... B62D 31/02; B62D 31/025; B62D 31/20; B62D 31/2054; B62D 27/06; B62D 53/067; B64D 9/00; B64D 9/003; B64D 2009/006; B64D 11/046; B64D 11/0696; B64D 11/0602; B64D 11/06; B60N 2/24; B60N 2/242; B60N 2/36; B60N 2/005; B60P 3/42

USPC ........ 296/193.04, 193.07, 37.6, 37.14, 26.09
See application file for complete search history.

(56) References Cited

U.S. PATENT DOCUMENTS

| | | | | |
|---|---|---|---|---|
| 3,469,355 | A * | 9/1969 | McGann, Jr. ........... | B60P 3/423 52/8 |
| 3,817,413 | A * | 6/1974 | Ham ..................... | B60P 1/6427 414/498 |
| 4,489,977 | A * | 12/1984 | Earing, Jr. ................ | B60P 3/42 296/183.1 |
| 5,938,262 | A * | 8/1999 | Mills ........................ | B60P 3/40 296/26.09 |
| 9,073,574 | B2 | 7/2015 | Cuddihy et al. | |
| 9,096,150 | B2 | 8/2015 | Cuddihy et al. | |
| 9,199,553 | B2 | 12/2015 | Cuddihy et al. | |
| 9,227,675 | B1 * | 1/2016 | Elquest ................... | B60P 1/64 |

(Continued)

*Primary Examiner* — Gregory A Blankenship
(74) *Attorney, Agent, or Firm* — Young Basile Hanlon & MacFarlane, P.C.

(57) ABSTRACT

A reconfigurable vehicle may include a vehicle frame body and a removable floor. The removable floor may be configurable based on a use case for the reconfigurable vehicle. The removable floor may be configured for passenger transport, goods transport, or both. The removable floor may include a rotating assembly. The rotating assembly may include a wheel and a catch element. The removable floor may include one or more connection interfaces.

20 Claims, 12 Drawing Sheets

(56) References Cited

U.S. PATENT DOCUMENTS

| | | | | |
|---|---|---|---|---|
| 2001/0042996 A1* | 11/2001 | Gaspard, II | ............ | B60G 11/64 |
| | | | | 296/178 |
| 2011/0266845 A1* | 11/2011 | Marshall | ................ | B60R 21/13 |
| | | | | 297/216.1 |
| 2014/0123462 A1* | 5/2014 | Rollfink | ................ | B64D 11/06 |
| | | | | 29/428 |
| 2014/0255137 A1* | 9/2014 | Haertel | .................... | B64D 9/00 |
| | | | | 414/529 |
| 2016/0244186 A1* | 8/2016 | Brown | ...................... | B64C 1/20 |
| 2017/0028900 A1* | 2/2017 | Stocks | ...................... | B60P 3/42 |
| 2017/0197679 A1* | 7/2017 | Scaringe | .............. | B60K 17/354 |
| 2020/0140089 A1* | 5/2020 | Kismarton | ................ | B64C 1/22 |
| 2020/0247481 A1* | 8/2020 | Barnicle | ............ | B62D 25/2054 |
| 2020/0399080 A1* | 12/2020 | Dry | ........................ | B60P 3/423 |
| 2021/0078643 A1* | 3/2021 | Stimpson | ........... | B62D 25/2054 |

* cited by examiner

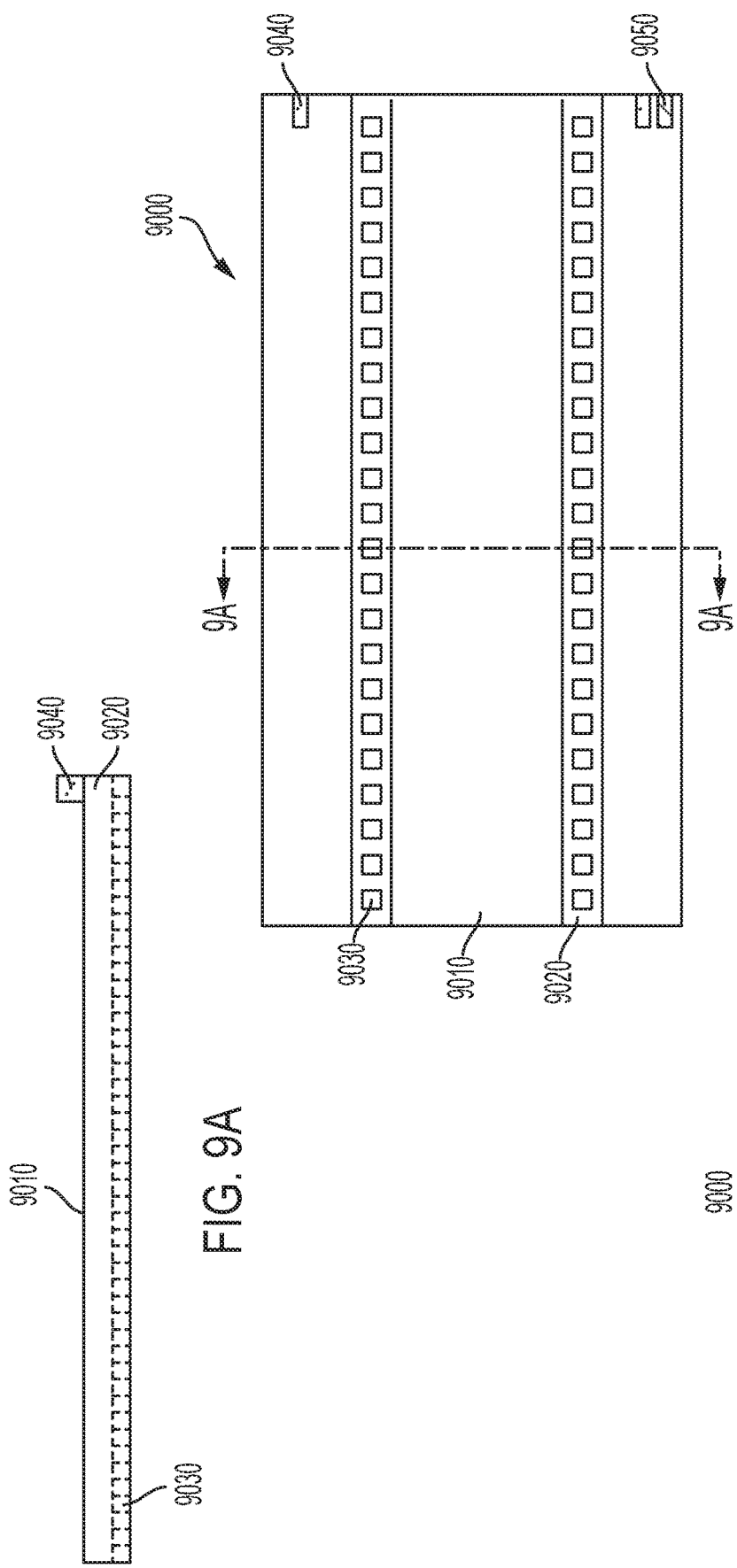

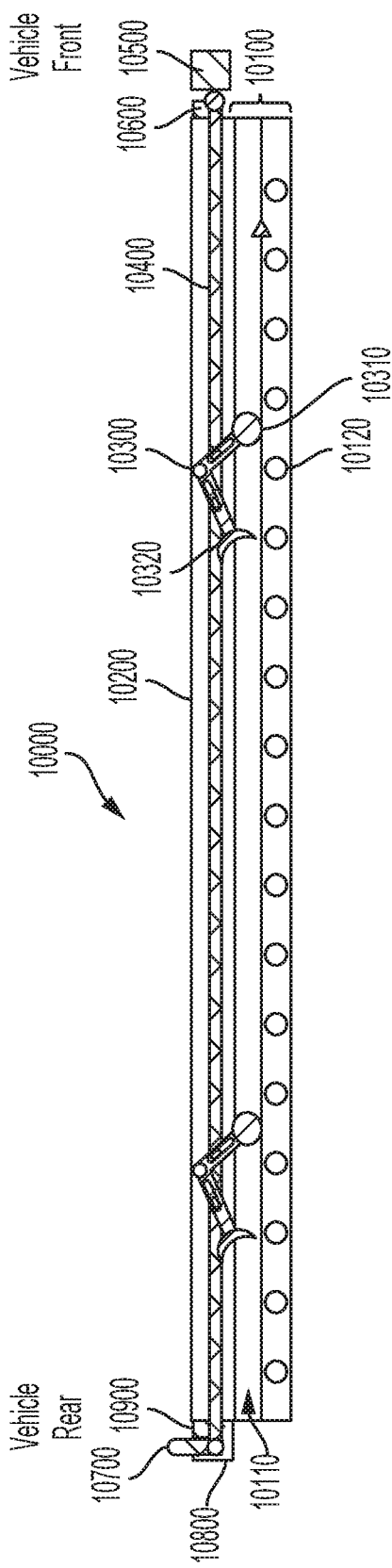
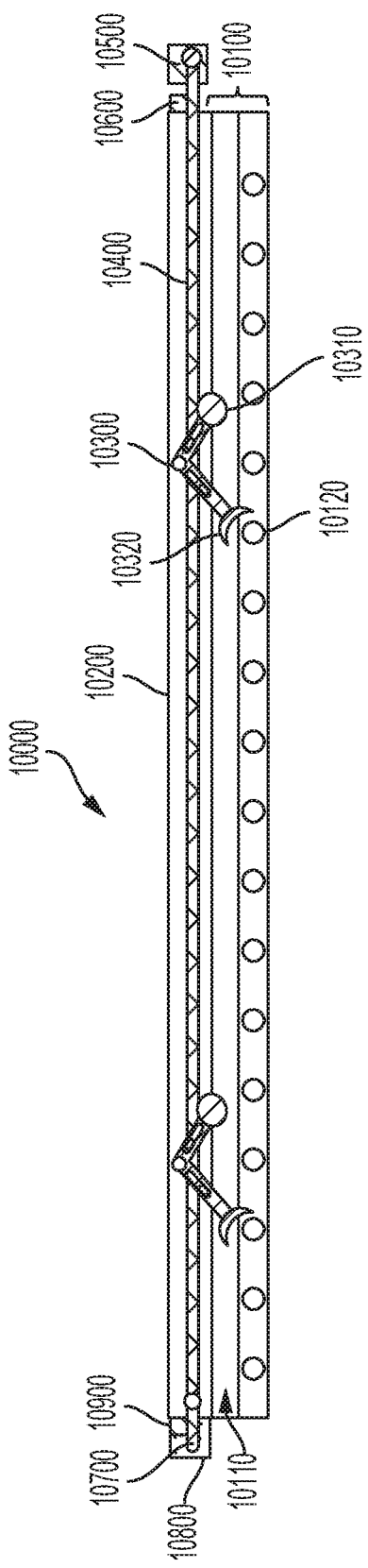
FIG. 10A
FIG. 10B

REMOVABLE INTERIOR FOR RECONFIGURABLE VEHICLES

CROSS REFERENCE TO RELATED APPLICATION

This application claims priority to and the benefit of U.S. Provisional Application Patent Ser. No. 62/900,761, filed Sep. 16, 2019, the entire disclosure of which is hereby incorporated by reference.

TECHNICAL FIELD

This disclosure relates to reconfigurable vehicles. More specifically, this disclosure relates to removable interior configurations for reconfigurable vehicles.

BACKGROUND

A critical challenge in the economic feasibility of autonomous vehicles fleets is the need for high utilization rates to offset expensive sensor, computing, and other hardware systems. An important concept to promote higher utilization of vehicles is that of reconfigurable vehicles, so that the same base autonomous vehicle can be used for a variety of use cases, such as transporting passengers, goods, or used as mobile stores or offices. To achieve this reconfigurability, significant portions of the payload area of the vehicle need to be restructured or the entire payload area swapped entirely such as by attaching a new vehicle body onto an autonomous driving base. Currently, these methods are time consuming and can require expensive equipment to reconfigure the vehicles, which reduces any advantage in utilization rate since these vehicles cannot be in service while they are being reconfigured.

Typical solutions include a low-sitting autonomous skateboard-dike base that the use-case specific compartment is lowered onto with a crane or other implement. The challenge with these solutions is that it is both time consuming to have large equipment such as cranes to transition the vehicles, as well as much of the sensing equipment required for autonomous driving would have to be present on the replaceable compartments (e.g. cameras, lidars) to achieve the required line of sight. It also means that each replaceable compartment would have to be configured for the relevant use case (e.g. passenger transportation), and would not allow for easily using part of the vehicle payload for different types of use cases at the same time.

SUMMARY

Disclosed herein are examples of reconfigurable vehicles. A reconfigurable vehicle may include a vehicle frame body and a removable platform. The removable platform may be configurable based on a use case for the reconfigurable vehicle. The removable platform may be configured for passenger transport, goods transport, a mobile office, a mobile restaurant, a mobile hotel, a mobile store, any other use case, or any combination thereof.

In an aspect, the vehicle frame body may include a fixed vehicle floor. The vehicle frame body may include a connection interface. The fixed vehicle floor may include one or more rails. The fixed vehicle floor may include one or more attachment points.

The removable platform may include one or more rotating assemblies. Each rotating assembly may include a wheel, a catch element, or both. The removable floor may include one or more connection interfaces. The removable floor may include one or more latches.

In an aspect, a removable floor may include a rotating assembly, a first connection interface, and a second connection interface. The rotating assembly may include a wheel, a catch element, or both. The first connection interface may be configured to connect to a connection interface of a vehicle. The second connection interface may be configured to connect to another removable floor.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 9A is a diagram of a side-view of an example of a removable interior attachment mechanism of a reconfigurable autonomous vehicle in accordance with embodiments of this disclosure.

FIG. 9B is a diagram of a top-view of an example of a removable interior attachment mechanism of a reconfigurable autonomous vehicle in accordance with embodiments of this disclosure.

FIG. 9C is a diagram of a cross-sectional view of an example of a removable interior attachment mechanism of a reconfigurable autonomous vehicle in accordance with embodiments of this disclosure.

FIG. 10A is a diagram of a cross-sectional side-view of an example of a removable interior attachment system of a reconfigurable autonomous vehicle in an unlocked position in accordance with embodiments of this disclosure.

FIG. 10B is a diagram of a cross-sectional side-view of an example of a removable interior attachment system of a reconfigurable autonomous vehicle in a locked position in accordance with embodiments of this disclosure.

DETAILED DESCRIPTION

Figure 1:
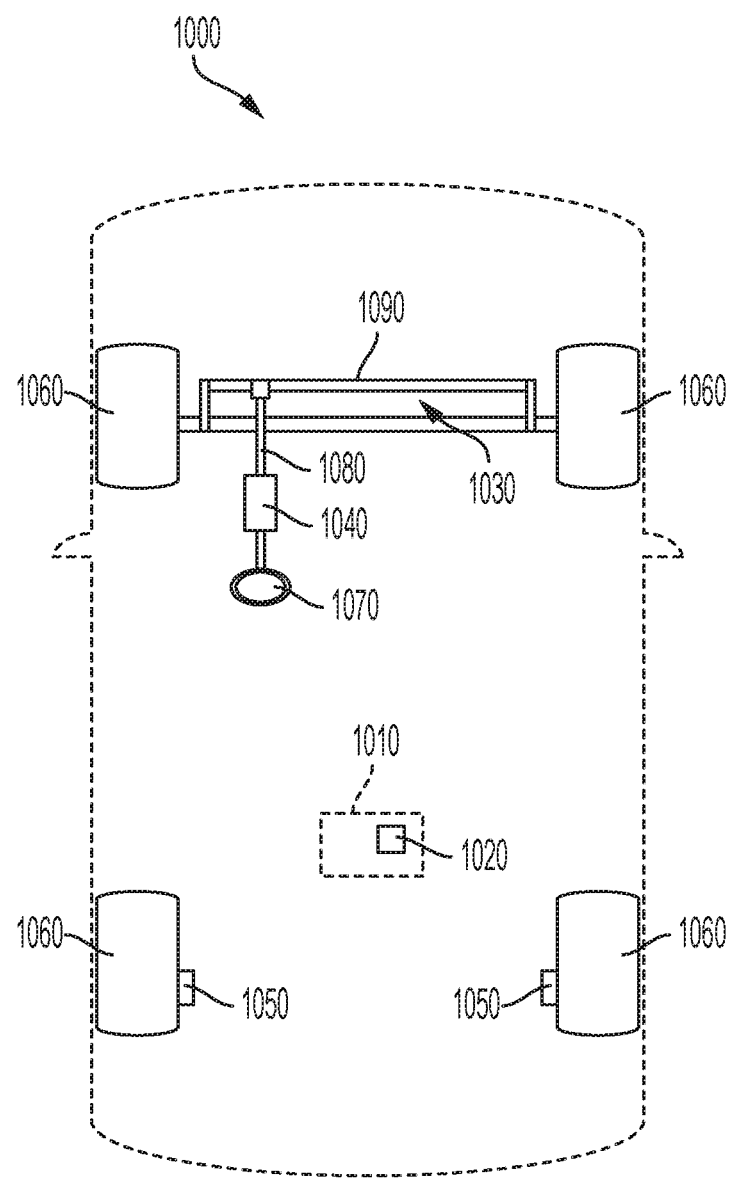
FIG. 1 is a diagram of an example of a vehicle in accordance with embodiments of this disclosure.

The embodiments disclosed herein include reconfigurable vehicles that provide fast reconfigurability in minutes as opposed to hours or days. The reconfigurable vehicles provide high utilization due to minimal downtimes during the reconfiguration process. The reconfigurable vehicles may be reconfigured without the use of expensive equipment such as cranes. In some implementations, the reconfiguration process may be fully autonomous. The reconfigurable vehicles include swappable interiors, and the swappable interiors may not contain safety-critical sensors used in the dynamic driving task (DDT).

One challenge in the economic feasibility of an autonomous vehicle fleet is the need for high utilization rates to offset expensive sensor, computing, and other hardware systems. Reconfigurable vehicles may be used to promote higher utilization such that the same base autonomous vehicle may be used for a variety of use cases, such as transporting passengers, goods, or used as mobile stores or offices. To achieve rapid reconfigurability, removable interior modules may be used. The removable interior modules may quickly and securely attach to a feature integrated into the vehicle floor. The removable interior modules may include a removable floor that is configured for ease of insertion and extraction. The removable interior modules may be configured to be securely connected to the vehicle and provide connections for power, data, or both to and from the vehicle. The removable interior modules may allow for multiple interiors to be installed in a single vehicle. The removable interior modules may be of different sizes.

Reference will now be made in greater detail to a preferred embodiment of the invention, an example of which is illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle 1000 in accordance with embodiments of this disclosure. The vehicle 1000 may be an autonomous vehicle (AV) or a semi-autonomous vehicle. As shown in FIG. 1, the vehicle 1000 includes a control system 1010. The control system 1010 may be referred to as a controller. The control system 1010 includes a processor 1020. The processor 1020 is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system 1030 and a second maximum yaw torque resulting from actuating a brake system.

The steering system 1030 may include a steering actuator 1040 that is an electric power-assisted steering actuator. The brake system may include one or more brakes 1050 coupled to respective wheels 1060 of the vehicle 1000. Additionally, the processor 1020 may be programmed to command the brake system to apply a net asymmetric braking force by each brake 1050 applying a different braking force than the other brakes 1050.

The processor 1020 may be further programmed to command the brake system to apply a braking force, for example, a net asymmetric braking force, in response to a failure of the steering system 1030. Additionally or alternatively, the processor 1020 may be programmed to provide a warning to an occupant in response to the failure of the steering system 1030. The steering system 1030 may be a power-steering control module. The control system 1010 may include the steering system 1030. Additionally, the control system 1010 may include the brake system.

The steering system 1030 may include a steering actuator 1040 that is an electric power-assisted steering actuator. The brake system may include two brakes 1050 coupled to respective wheels 1060 on opposite sides of the vehicle 1000. Additionally, the method may include commanding the brake system to apply a net asymmetric braking force by each brake 1050 applying a different braking force.

The control system 1010 allows one of the steering system 1030 and the brake system to take over for the other of the steering system 1030 and the brake system if the other fails while the vehicle 1000 is executing a turn. Whichever of the steering system 1030 and the braking system remains operable is then able to apply sufficient yaw torque to the vehicle 1000 to continue the turn. The vehicle 1000 is, therefore, less likely to impact an object such as another vehicle or a roadway barrier, and any occupants of the vehicle 1000 are less likely to be injured.

The vehicle 1000 may operate in one or more of the levels of autonomous vehicle operation. For purposes of this disclosure, an autonomous mode is defined as one in which each of propulsion (e.g., via a powertrain including an electric motor and/or an internal combustion engine), braking, and steering of the vehicle 1000 are controlled by the processor 1020; in a semi-autonomous mode the processor 1020 controls one or two of the propulsion, braking, and steering of the vehicle 1000. Thus, in one example, non-autonomous modes of operation may refer to SAE levels 0-1, partially autonomous or semi-autonomous modes of operation may refer to SAE levels 2-3, and fully autonomous modes of operation may refer to SAE levels 4-5.

Figure 2:
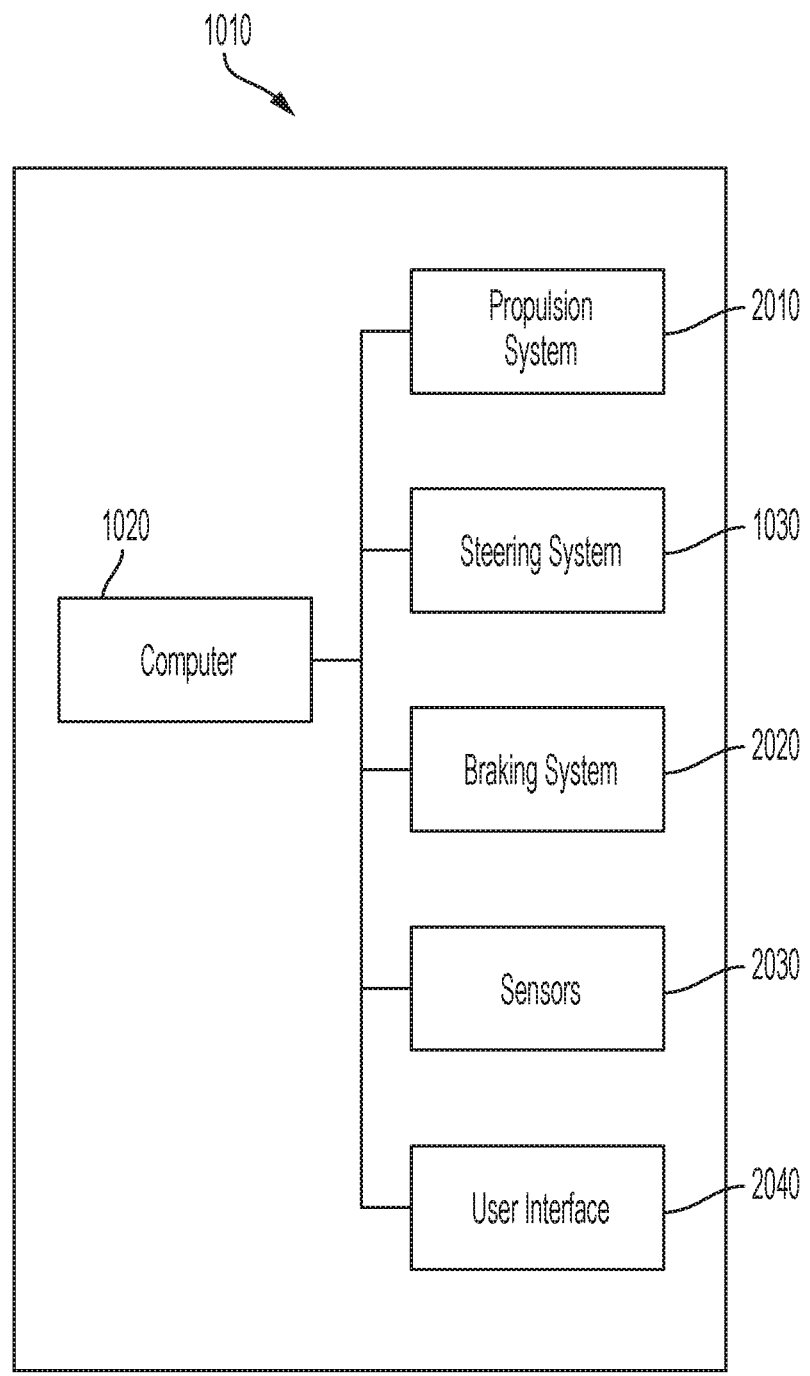
FIG. 2 is a diagram of an example of the control system shown in FIG. 1.

With reference to FIG. 2, the control system 1010 includes the processor 1020. The processor 1020 is included in the vehicle 1000 for carrying out various operations, including as described herein. The processor 1020 is a computing device that generally includes a processor and a memory, the memory including one or more forms of computer-readable media, and storing instructions executable by the processor for performing various operations, including as disclosed herein. The memory of the processor 1020 further generally stores remote data received via various communications mechanisms; e.g., the processor 1020 is generally configured for communications on a communications network within the vehicle 1000. The processor 1020 may also have a connection to an onboard diagnostics connector (OBD-II). Although one processor 1020 is shown in FIG. 2 for ease of illustration, it is to be understood that the processor 1020 could include, and various operations described herein could be carried out by one or more computing devices. The processor 1020 may be a control module, for example, a power-steering control module, or may include a control module among other computing devices.

The control system 1010 may transmit signals through the communications network, which may be a controller area network (CAN) bus, Ethernet, Local Interconnect Network (LIN), Bluetooth, and/or by any other wired or wireless communications network. The processor 1020 may be in communication with a propulsion system 2010, the steering system 1030, the brake system 2020, sensors 2030, and/or a user interface 2040, among other components.

With continued reference to FIG. 2, the propulsion system 2010 of the vehicle 1000 generates energy and translates the energy into motion of the vehicle 1000. The propulsion system 2010 may be a known vehicle propulsion subsystem, for example, a conventional powertrain including an internal-combustion engine coupled to a transmission that transfers rotational motion to road wheels 1060; an electric powertrain including batteries, an electric motor, and a transmission that transfers rotational motion to the road wheels 1060; a hybrid powertrain including elements of the conventional powertrain and the electric powertrain; or any other type of propulsion. The propulsion system 2010 is in communication with and receives input from the processor 1020 and from a human driver. The human driver may control the propulsion system 2010 via, e.g., an accelerator pedal and/or a gear-shift lever (not shown).

With reference to FIGS. 1 and 2, the steering system 1030 is typically a known vehicle steering subsystem and controls the turning of the road wheels 1060. The steering system 1030 is in communication with and receives input from a steering wheel 1070 and the processor 1020. The steering system 1030 may be a rack-and-pinion system with electric power-assisted steering via a steering actuator 1040, a steer-by-wire system, as are both known in the art, or any other suitable system. The steering system 1030 may include the steering wheel 1070 fixed to a steering column 1080 coupled to a steering rack 1090.

With reference to FIG. 1, the steering rack 1090 is turnably coupled to the road wheels 1060, for example, in a four-bar linkage. Translational motion of the steering rack 1090 results in turning off the road wheels 1060. The steering column 1080 may be coupled to the steering rack 1090 via a rack-and-pinion, that is, gear meshing between the pinion gear and rack gear (not shown).

The steering column 1080 transfers rotation of the steering wheel 1070 to movement of the steering rack 1090. The steering column 1080 may be, e.g., a shaft connecting the steering wheel 1070 to the steering rack 1090. The steering column 1080 may house a torsion sensor and a clutch (not shown).

The steering wheel 1070 allows an operator to steer the vehicle 1000 by transmitting rotation of the steering wheel 1070 to movement of the steering rack 1090. The steering wheel 1070 may be, e.g., a rigid ring fixedly attached to the steering column 1080 such as is known.

With continued reference to FIG. 1, the steering actuator 1040 is coupled to the steering system 1030, e.g., the steering column 1080, so as to cause turning of the road wheels 1060. For example, the steering actuator 1040 may be an electric motor rotatably coupled to the steering column 1080, that is, coupled so as to be able to apply a steering torque to the steering column 1080. The steering actuator 1040 may be in communication with the processor 1020.

The steering actuator 1040 may provide power assist to the steering system 1030. In other words, the steering actuator 1040 may provide torque in a direction in which the steering wheel 1070 is being rotated by a human driver, allowing the driver to turn the steering wheel 1070 with less effort. The steering actuator 1040 may be an electric power-assisted steering actuator.

With reference to FIGS. 1 and 2, the brake system 2020 is typically a known vehicle braking subsystem and resists the motion of the vehicle 1000 to thereby slow and/or stop the vehicle 1000. The brake system 2020 includes brakes 1050 coupled to the road wheels 1060. The brakes 1050 may be friction brakes such as disc brakes, drum brakes, band brakes, and so on; regenerative brakes; any other suitable type of brakes; or a combination. The brakes 1050 may be coupled to, e.g., respective road wheels 1060 on opposite sides of the vehicle 1000. The brake system 2020 is in communication with and receives input from the processor 1020 and a human driver. The human driver may control the braking via, e.g., a brake pedal (not shown).

With reference to FIG. 2, the vehicle 1000 may include the sensors 2030. The sensors 2030 may detect internal states of the vehicle 1000, for example, wheel speed, wheel orientation, and engine and transmission variables. The sensors 2030 may detect the position or orientation of the vehicle 1000, for example, global positioning system (GPS) sensors; accelerometers such as piezo-electric or microelectromechanical systems (MEMS); gyroscopes such as rate, a ring laser, or fiber-optic gyroscopes; inertial measurements units (IMU); and magnetometers. The sensors 2030 may detect the external world, for example, radar sensors, scanning laser rangefinders, light detection and ranging (LIDAR) devices, and image processing sensors such as cameras. The sensors 2030 may include communications devices, for example, vehicle-to-infrastructure (V2I) devices, vehicle-to-vehicle (V2V) devices, or vehicle-to-everything (V2E) devices.

The user interface 2040 presents information to and receives information from an occupant of the vehicle 1000. The user interface 2040 may be located, e.g., on an instrument panel in a passenger cabin (not shown) of the vehicle 1000, or wherever may be readily seen by the occupant. The user interface 2040 may include dials, digital readouts, screens, speakers, and so on for output, i.e., providing information to the occupant, e.g., a human-machine interface (HMI) including elements such as are known. The user interface 2040 may include buttons, knobs, keypads, touchscreens, microphones, and so on for receiving input, i.e., information, instructions, etc., from the occupant.

Figure 3:
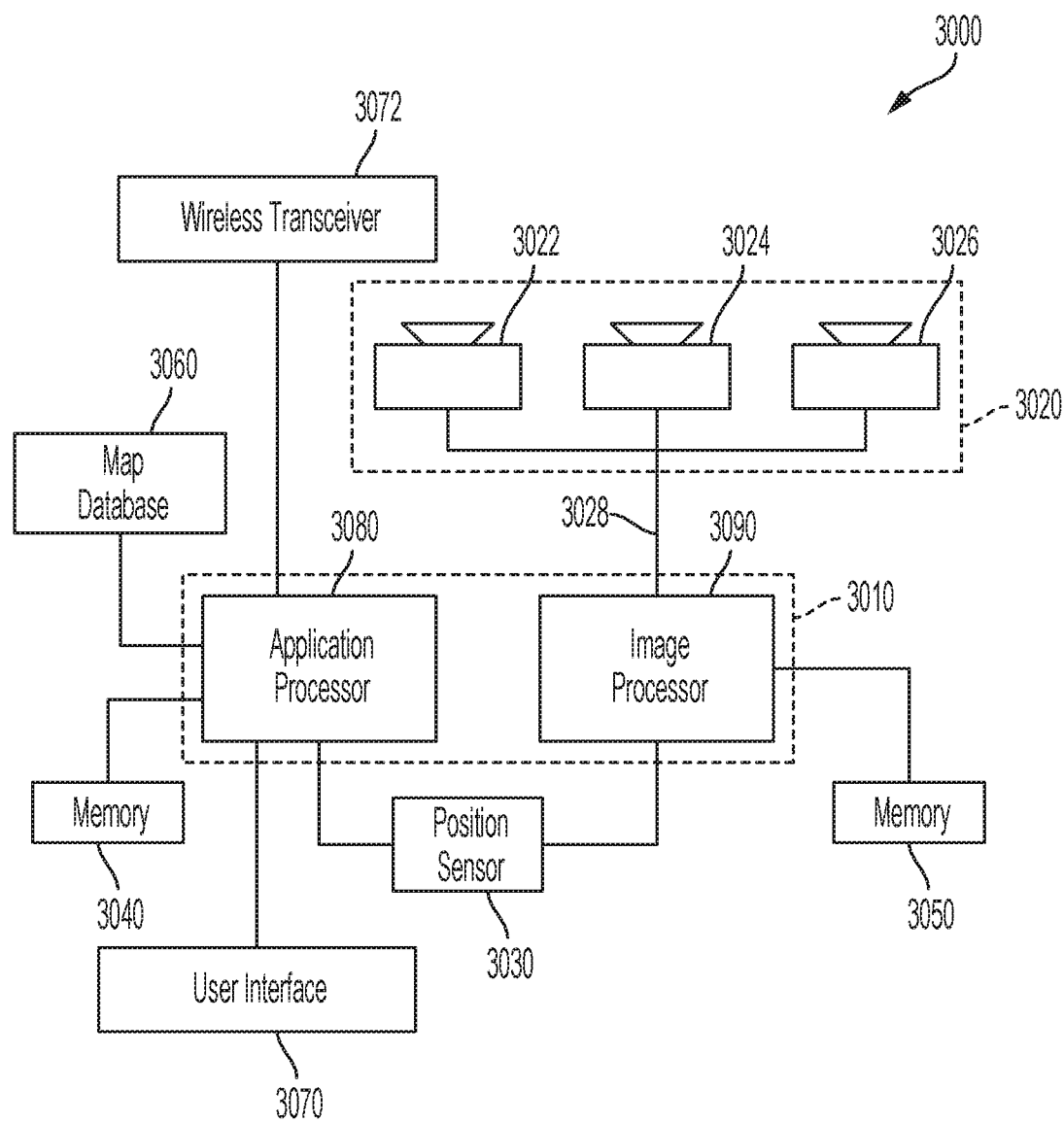
FIG. 3 is a diagram of an example of a vehicle control system in accordance with embodiments of this disclosure.

FIG. 3 is a diagram of an example of a vehicle control system 3000 in accordance with embodiments of this disclosure. Vehicle control system 3000 may include various components depending on the requirements of a particular implementation. In some embodiments, vehicle control system 3000 may include a processing unit 3010, an image acquisition unit 3020, a position sensor 3030, one or more memory units 3040, 3050, a map database 3060, a user interface 3070, and a wireless transceiver 3072. Processing unit 3010 may include one or more processing devices. In some embodiments, processing unit 3010 may include an applications processor 3080, an image processor 3090, or any other suitable processing device. Similarly, image acquisition unit 3020 may include any number of image acquisition devices and components depending on the requirements of a particular application. In some embodiments, image acquisition unit 3020 may include one or more image capture devices (e.g., cameras, CCDs, or any other type of image sensor), such as image capture device 3022, an image capture device 3024, an image capture device 3026. System 3000 may also include a data interface 3028 communicatively connecting processing unit 3010 to image acquisition unit 3020. For example, data interface 3028 may include any wired and/or wireless link or links for transmitting image data acquired by image acquisition unit 3020 to processing unit 3010.

Wireless transceiver 3072 may include one or more devices configured to exchange transmissions over an air interface to one or more networks (e.g., cellular, the Internet, etc.) by use of a radio frequency, infrared frequency, magnetic field, or an electric field. Wireless transceiver 3072 may use any known standard to transmit and/or receive data (e.g., Wi-Fi, Bluetooth®, Bluetooth Smart, 802.15.4, Zig-Bee, etc.). Such transmissions may include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 3080 and image processor 3090 may include various types of hardware-based processing devices. For example, either or both of applications processor 3080 and image processor 3090 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 3080 and/or image processor 3090 may include any type of single or multi-core processor, mobile device microcontroller, the central processing unit, or the like.

In some embodiments, applications processor 3080 and/or image processor 3090 may include multiple processing units with local memory and instruction sets. Such processors may include video inputs for receiving image data from multiple image sensors and may also include video out capabilities. In one example, the processor may use 90 nm-micron technology operating at 332 Mhz.

Any of the processing devices disclosed herein may be configured to perform certain functions. Configuring a processing device, such as any of the described processors, other controllers or microprocessors, to perform certain functions may include programming of computer-executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware-based components of a host vehicle.

While FIG. 3 depicts two separate processing devices included in the processing unit 3010, more or fewer processing devices may be used. For example, in some embodiments, a single processing device may be used to accomplish the tasks of applications processor 3080 and image processor 3090. In other embodiments, these tasks may be performed by more than two processing devices. Further, in some embodiments, vehicle control system 3000 may include one or more of processing unit 3010 without including other components, such as image acquisition unit 3020.

Processing unit 3010 may comprise various types of devices. For example, processing unit 3010 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock, and input-output circuits. The memory may store software that, when executed by the processor, controls the operation of the system. The memory may include databases and image processing software. The memory may comprise any number of random access memories, read-only memories, flash memories, disk drives, optical storage, tape storage, removable storage and other types of storage. In one instance, the memory may be separate from the processing unit 3010. In another instance, the memory may be integrated into the processing unit 3010.

Each memory 3040, 3050 may include software instructions that when executed by a processor (e.g., applications processor 3080 and/or image processor 3090), may control operation of various aspects of the vehicle control system 3000. These memory units may include various databases and image processing software, as well as a trained system, such as a neural network, or a deep neural network, for example. The memory units 3040, 3050 may include random access memory, read-only memory, flash memory, disk drives, optical storage, tape storage, removable storage and/or any other types of storage. In some embodiments, memory units 3040, 3050 may be separate from the applications processor 3080 and/or image processor 3090. In other embodiments, these memory units may be integrated into applications processor 3080 and/or image processor 3090.

Position sensor 3030 may include any type of device suitable for determining a location associated with at least one component of the vehicle control system 3000. In some embodiments, position sensor 3030 may include a GPS receiver. Such receivers can determine a user position and velocity by processing signals broadcasted by global positioning system satellites. Position information from position sensor 3030 may be made available to applications processor 3080 and/or image processor 3090.

In some embodiments, vehicle control system 3000 may include components such as a speed sensor (e.g., a speedometer) for measuring a speed of vehicle 1000. Vehicle control system 3000 may also include one or more accelerometers (either single axis or multi-axis) for measuring accelerations of vehicle 1000 along one or more axes.

The memory units 3040, 3050 may include a database, or data organized in any other form, that indication a location of known landmarks. Sensory information (such as images, radar signal, depth information from LIDAR or stereo processing of two or more images) of the environment may be processed together with position information, such as a GPS coordinate, vehicle's ego-motion, etc. to determine a current location of the vehicle relative to the known landmarks, and refine the vehicle location.

User interface 3070 may include any device suitable for providing information to or for receiving inputs from one or more users of the vehicle control system 3000. In some embodiments, user interface 3070 may include user input devices, including, for example, a touchscreen, microphone, keyboard, pointer devices, track wheels, cameras, knobs, buttons, or the like. With such input devices, a user may be able to provide information inputs or commands to vehicle control system 3000 by typing instructions or information, providing voice commands, selecting menu options on a screen using buttons, pointers, or eye-tracking capabilities, or through any other suitable techniques for communicating information to vehicle control system 3000.

User interface 3070 may be equipped with one or more processing devices configured to provide and receive information to or from a user and process that information for use by, for example, applications processor 3080. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 3070 may include a display, speaker, tactile device, and/or any other devices for providing output information to a user.

Map database 3060 may include any type of database for storing map data useful to the vehicle control system 3000. In some embodiments, map database 3060 may include data relating to the position, in a reference coordinate system, of various items, including roads, water features, geographic features, businesses, points of interest, restaurants, gas stations, etc. Map database 3060 may store not only the locations of such items but also descriptors relating to those items, including, for example, names associated with any of the stored features. In some embodiments, map database 3060 may be physically located with other components of the vehicle control system 3000. Alternatively or additionally, map database 3060 or a portion thereof may be located remotely with respect to other components of the vehicle control system 3000 (e.g., processing unit 3010). In such embodiments, information from map database 3060 may be downloaded over a wired or wireless data connection to a network (e.g., over a cellular network and/or the Internet, etc.). In some cases, map database 3060 may store a sparse data model including polynomial representations of certain road features (e.g., lane markings) or target trajectories for the host vehicle. Map database 3060 may also include stored representations of various recognized landmarks that may be used to determine or update a known position of the host vehicle with respect to a target trajectory. The landmark representations may include data fields such as landmark type, landmark location, among other potential identifiers.

Image capture devices 3022, 3024, and 3026 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 3022, 3024, and 3026 will be further described with reference to FIG. 4 below.

One or more cameras (e.g., image capture devices 3022, 3024, and 3026) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor-based information or any other type of information relating to the environment of the host vehicle. Such information may include sensor output information or related information received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, or the like.

Figure 4:
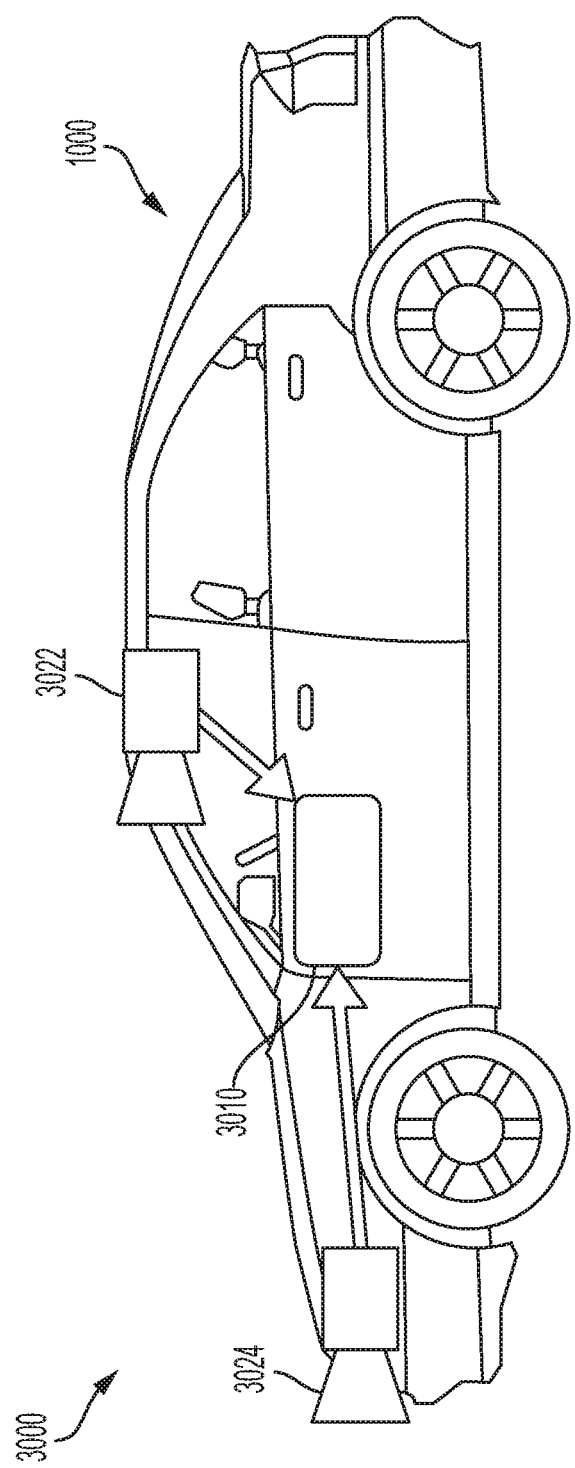
FIG. 4 is a diagram of an example of a side view of a vehicle including a vehicle control system in accordance with embodiments of this disclosure.

FIG. 4 is a diagram of an example of a side view of vehicle 1000 including a vehicle control system 3000 in accordance with embodiments of this disclosure. For example, vehicle 1000 may be equipped with a processing unit 3010 and any of the other components of the vehicle control system 3000, as described above relative to FIG. 3. While in some embodiments vehicle 1000 may be equipped with only a single image capture device (e.g., camera), in other embodiments, multiple image capture devices may be used. For example, either of image capture devices 3022 and 3024 of vehicle 1000, as shown in FIG. 4, may be part of an automated driving system imaging set.

The image capture devices included on vehicle 1000 as part of the image acquisition unit 3020 may be positioned at any suitable location. In some embodiments, image capture device 3022 may be located in the vicinity of the rearview mirror. This position may provide a line of sight similar to that of the driver of vehicle 1000, which may aid in determining what is and is not visible to the driver. Image capture device 3022 may be positioned at any location near the rearview mirror, but placing image capture device 3022 on the driver side of the mirror may further aid in obtaining images representative of the driver's field of view and/or line of sight.

Other locations for the image capture devices of image acquisition unit 3020 may also be used. For example, image capture device 3024 may be located on or in a bumper of vehicle 1000. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 3022, 3024, and 3026) may also be located in other locations. For example, the image capture devices may be located on or in one or both of the side mirrors of vehicle 1000, on the roof of vehicle 1000, on the hood of vehicle 1000, on the trunk of vehicle 1000, on the sides of vehicle 1000, mounted on, positioned behind, or positioned in front of any of the windows of vehicle 1000, and mounted in or near light fixtures on the front and/or back of vehicle 1000.

In addition to image capture devices, vehicle 1000 may include various other components of the vehicle control system 3000. For example, processing unit 3010 may be included on vehicle 1000 either integrated with or separate from an engine control unit (ECU) of the vehicle. Vehicle 1000 may also be equipped with a position sensor 3030, such as a GPS receiver and may also include a map database 3060 and memory units 3040 and 3050.

As discussed earlier, wireless transceiver 3072 may transmit and/or receive data over one or more networks (e.g., cellular networks, the Internet, etc.). For example, wireless transceiver 3072 may upload data collected by the vehicle control system 3000 to one or more servers, and download data from the one or more servers. Via wireless transceiver 3072, vehicle control system 3000 may receive, for example, periodic or on-demand updates to data stored in map database 3060, memory 3040, and/or memory 3050. Similarly, wireless transceiver 3072 may upload any data (e.g., images captured by image acquisition unit 3020, data received by position sensor 3030 or other sensors, vehicle control systems, etc.) from vehicle control system 3000 and/or any data processed by processing unit 3010 to the one or more servers.

Vehicle control system 3000 may upload data to a server (e.g., to the cloud) based on a privacy level setting. For example, vehicle control system 3000 may implement privacy level settings to regulate or limit the types of data (including metadata) sent to the server that may uniquely identify a vehicle and or driver/owner of a vehicle. Such settings may be set by a user via, for example, wireless transceiver 3072, be initialized by factory default settings, or by data received by wireless transceiver 3072.

Figure 5:
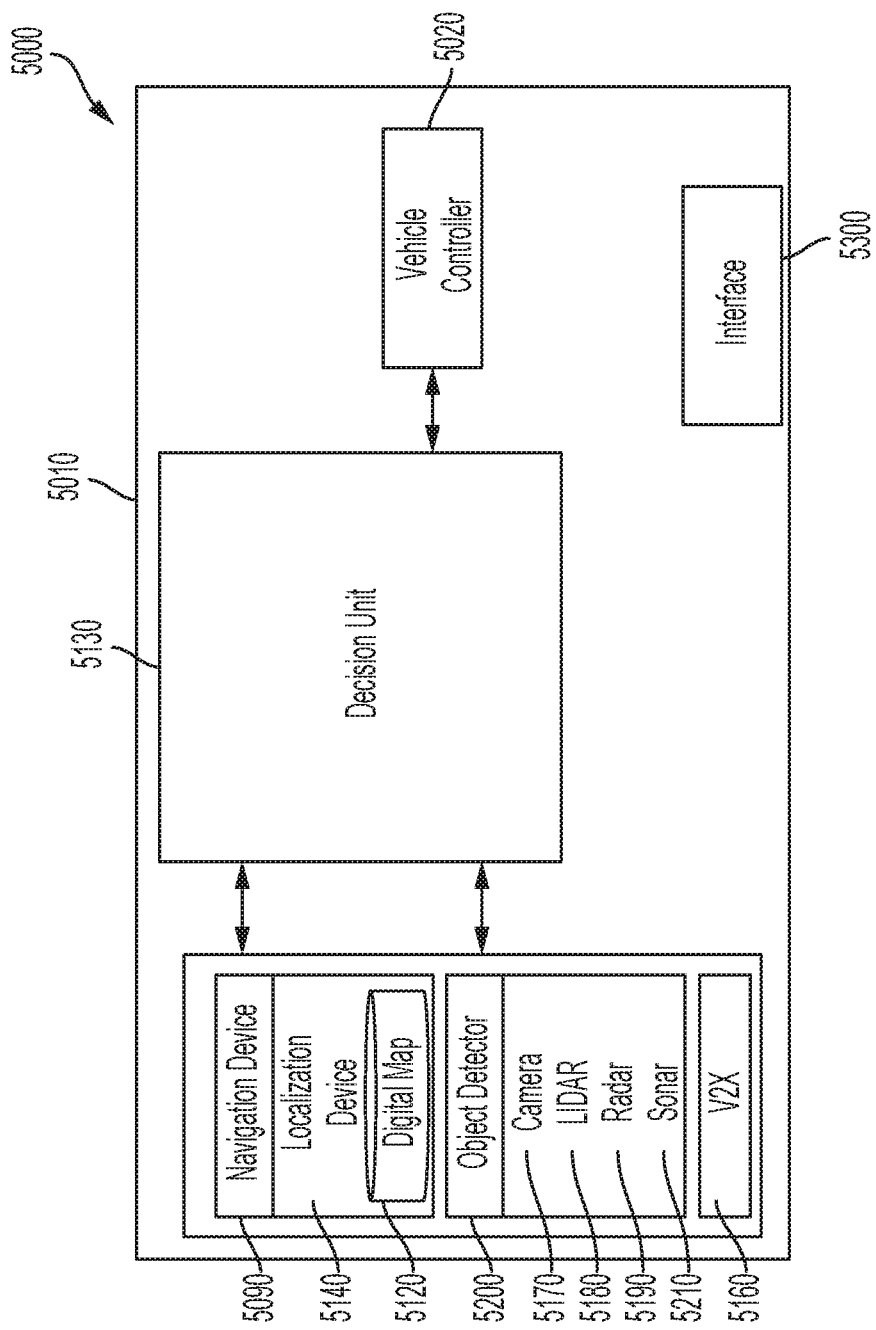
FIG. 5 is a diagram of an example of a vehicle control system in accordance with embodiments of this disclosure.

FIG. 5 is a diagram of an example of a vehicle system architecture 5000 in accordance with embodiments of this disclosure. The vehicle system architecture 5000 may be implemented as part of a host vehicle 5010.

The vehicle system architecture 5000 includes a navigation device 5090, a decision unit 5130, object detector 5200, V2X communications 5160 and a vehicle controller 5020. The navigation device 5090 may be used by the decision unit 5130 to determine a travel path of the host vehicle 5010 to a destination. The travel path, for example, may include a travel route or a navigation path. The navigation device 5090, the decision unit 5130 and the vehicle controller 5020 may be collectively used to determine where to steer the host vehicle 5010 along a roadway such that the host vehicle 5010 is appropriately located on the roadway relative to, for example, lane markings, curbs, traffic signs, pedestrians, other vehicles, etc., determine a route based on a digital map 5120 that the host vehicle 5010 is instructed to follow to arrive at a destination, or both.

In order to determine where the host vehicle 5010 is located on the digital map 5120, the navigation device 5090 may include a localization device 5140. A camera 5170, a radar unit 5190, a sonar unit 5210, a LIDAR unit 5180 or any combination thereof may be used to detect relatively permanent objects proximate to the host vehicle 5010 that are indicated on the digital map 5120, for example, traffic signals, buildings, etc., and determine a relative location relative to those objects in order to determine where the host vehicle 5010 is located on the digital map 5120. This process may be referred to as map localization. The functions of the navigation device 5090, the information provided by the navigation device 5090, or both, may be all or in part provided by way of V2I communications, V2V communications, vehicle-to-pedestrian (V2P) communications, or a combination thereof, which may generically be labeled as V2X communications 5160. The navigation device 5090, localization device 5140, or both may include a processor(s) such as a microprocessor or other control circuitry such as analog circuitry, digital circuitry, or both, including an application specific integrated circuit (ASIC) for processing data. The navigation device 5090, localization device 5140, or both may include a memory, including a non-volatile memory, such as electrically erasable programmable read-only memory (EEPROM) for storing one or more routines, thresholds, captured data, or a combination thereof.

In some implementations, an object detector 5200 may include the sonar unit 5210, the camera 5170, the LIDAR unit 5180, and the radar unit 5190. The object detector 5200 may be used to detect the relative location of another entity and determine an intersection point where another entity will intersect the travel path of the host vehicle 5010. In order to determine the intersection point and the relative timing of when the host vehicle 5010 and another entity will arrive at the intersection point, the object detector 5200 may be used by the vehicle system architecture 5000 to determine, for example, a relative speed, a separation distance of another entity from the host vehicle 5010, or both. The functions of the object detector 5200, the information provided by the object detector 5200, or both, may be all or in part by way of V2I communications, V2V communications, V2P communications, or a combination thereof, which may generically be labeled as V2X communications 5160. Accordingly, the vehicle system architecture 5000 may include a transceiver to enable such communications.

The vehicle system architecture 5000 includes a decision unit 5130 that is in communication with the object detector 5200, and the navigation device 5090. The communication may be by way of, but not limited to, wires, wireless communication, or optical fiber. The decision unit 5130 may include one or more processors such as a microprocessor or other control circuitry such as analog circuitry, digital circuitry, or both, including an application specific integrated circuit (ASIC) for processing data. The decision unit 5130 may include a memory, including a non-volatile memory, such as electrically erasable programmable read-only memory (EEPROM) for storing one or more routines, thresholds, captured data, or a combination thereof. The decision unit 5130 may determine or control route or path planning, local driving behavior, and trajectory planning for the host vehicle 5010. The host vehicle 5010 includes an interface 5300. The interface 5300 is configured to connect to a removable platform of the configurable interior.

The vehicle system architecture 5000 includes a vehicle controller or trajectory tracker 5020 that is in communication with the decision unit 5130. The vehicle controller 5020 may execute a defined geometric path by applying appropriate vehicle commands such as steering, throttle, braking and the like motions to physical control mechanisms such as steering, accelerator, brakes, and the like that guide the vehicle along the geometric path. The vehicle controller 5020 may include a processor(s) such as a microprocessor or other control circuitry such as analog circuitry, digital circuitry, or both, including an application specific integrated circuit (ASIC) for processing data. The vehicle controller 5020 may include a memory, including a non-volatile memory, such as electrically erasable programmable read-only memory (EEPROM) for storing one or more routines, thresholds, captured data, or a combination thereof.

The host vehicle 5010 may operate in an automated mode where a human operator is not needed to operate the vehicle 5010. In the automated mode, the vehicle control system 5000 (using, for example, the vehicle controller 5020, the decision unit 5130, navigation device 5090, the object detector 5200 and the other described sensors and devices) autonomously controls the vehicle 5010. Alternatively, the host vehicle may operate in a manual mode where the degree or level of automation may be little more than providing steering advice to a human operator. For example, in manual mode, the vehicle system architecture 5000 may assist the human operator as needed to arrive at a selected destination, avoid interference or collision with another entity, or both, where another entity may be another vehicle, a pedestrian, a building, a tree, an animal, or any other object that the vehicle 5010 may encounter.

Figure 6:
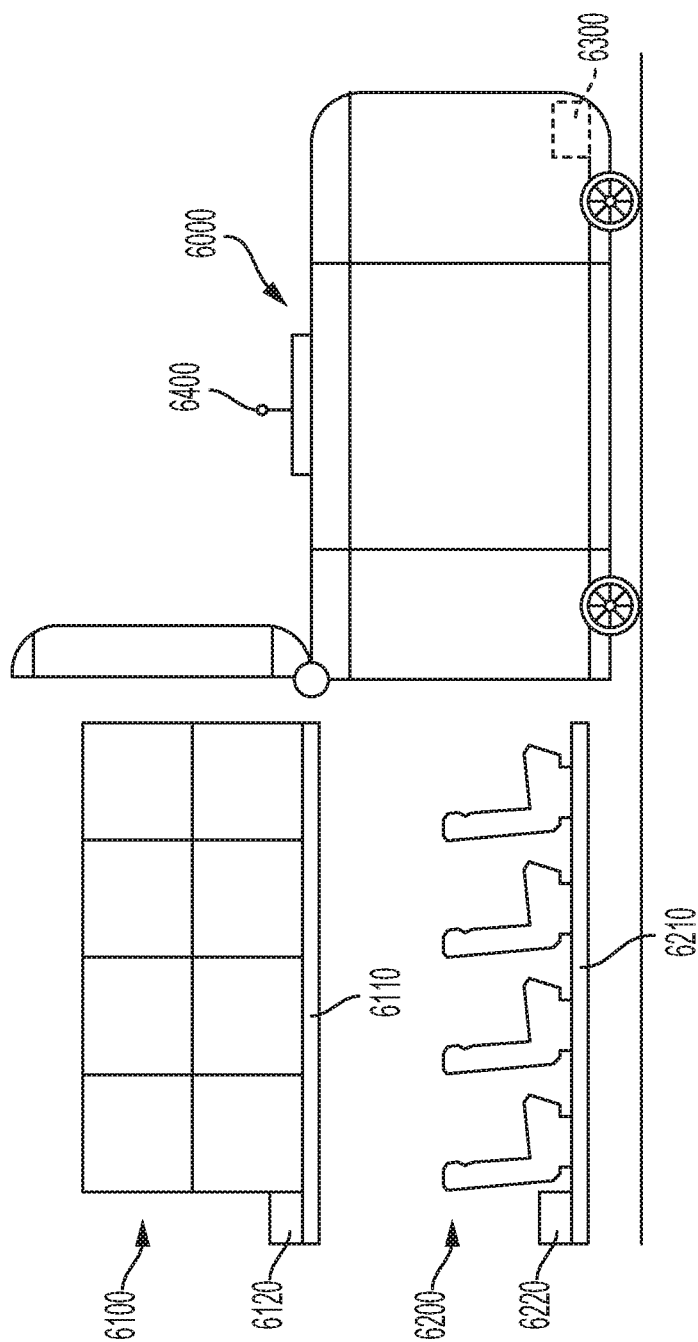
FIG. 6 is a diagram of an example of a reconfigurable autonomous vehicle in accordance with embodiments of this disclosure.

FIG. 6 is a diagram of an example of a reconfigurable autonomous vehicle 6000 in accordance with embodiments of this disclosure. As shown in FIG. 6, the autonomous vehicle 6000 may be reconfigured between use cases by exchanging only the interior elements 6100, 6200 of the vehicle, and using a removable platform 6110, 6210 with the relevant elements pre-attached to minimize the time needed for reconfiguration. Different types of platforms can be pre-configured to different use cases. As shown in FIG. 6, removable platform 6110 is configured for cargo and may contain racks or other cargo attachments, and removable platform 6210 is configured for passenger transport and may contain seating or handholds. The removable platforms 6110, 6210 are configured to attach to the floor of the vehicle so as to make a "second floor." One or both ends of the autonomous vehicle 6000 may be configured to lift up, out, or detach to allow the removable platform 6110, 6210 to be inserted into the vehicle. In some implementations, the left side, the right side, or both sides of the autonomous vehicle 6000 may be configured to lift up to allow the removable platform 6110, 6210 to be inserted into the vehicle. Each removable platform 6110, 6120 may be configured with application specific connections and computing apparatuses 6120, 6220.

As shown in FIG. 6, the application specific connections and computing apparatuses 6120, 6220 each include an interface configured to connect to an interface 6300 of the autonomous vehicle 6000 for power and communication. This allows for the removable platforms 6110, 6210 to have sensing units relevant to the use case that can be monitored remotely via the same communication channel(s) the autonomous vehicle 6000 uses to communicate with the operations center. The autonomous vehicle 6000 may include a communications element 6400 such as an antenna on top of the vehicle. The communications element 6400 may be configured to communicate with operators or monitor activity via cellular, satellite communication (SATCOM), radio, or other communications methods. Additionally, the power and communications connections can be used for other use-case-dependent systems such as climate control, lighting, or entertainment systems.

Figure 7:
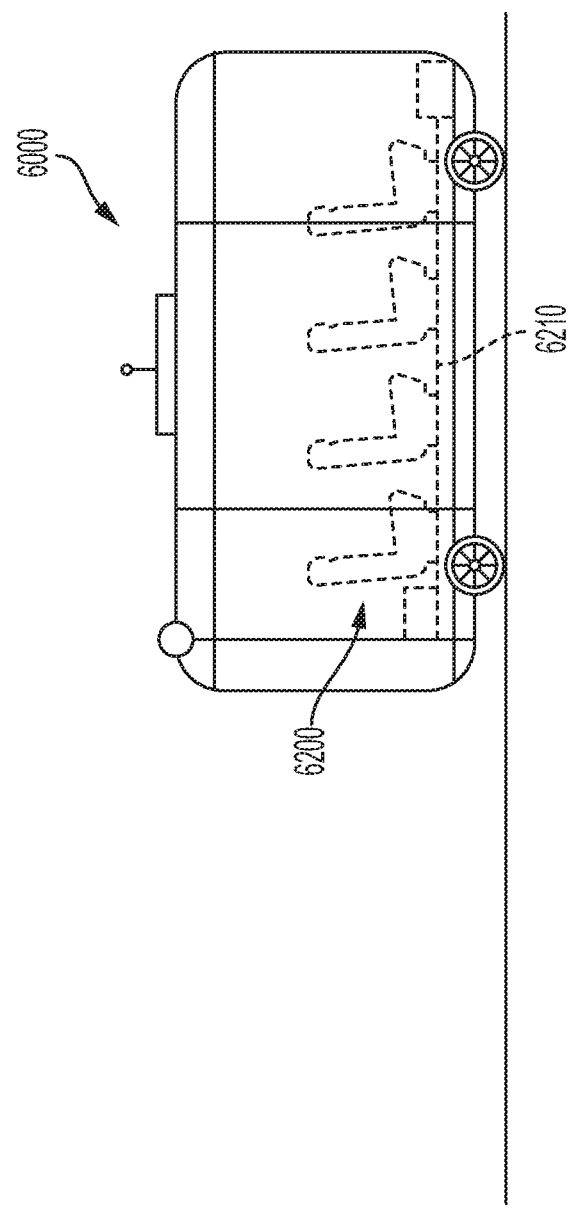
FIG. 7 is a diagram of an example of the autonomous vehicle of FIG. 6 with an interior element attached. In accordance with embodiments of this disclosure.

FIG. 7 is a diagram of an example of the autonomous vehicle 6000 of FIG. 6 with the interior element 6200 attached. As shown in FIG. 7, this example allows all the expensive vehicle sensing and hardware systems needed for autonomous operation to reside on the autonomous vehicle base and frame, and only minimal cost would be associated with the removable interiors. For each use case, only the hardware, sensors, and computing associated with that use case would be installed on the removable platform. Once the removable platform 6210 has been inserted and attached to the vehicle, the lifted end of the vehicle can be lowered to close the vehicle for usage.

This example includes both physical attachment between the platform and the vehicle base as well as connections for power and communication. This allows for the platforms to have sensing units relevant to the use case that can be monitored remotely via the same communication channel(s) the autonomous vehicle uses to communicate with the operations center. Additionally, the power and communications connections can be used for other use-case-dependent systems such as climate control, lighting, or entertainment systems.

Figure 8:
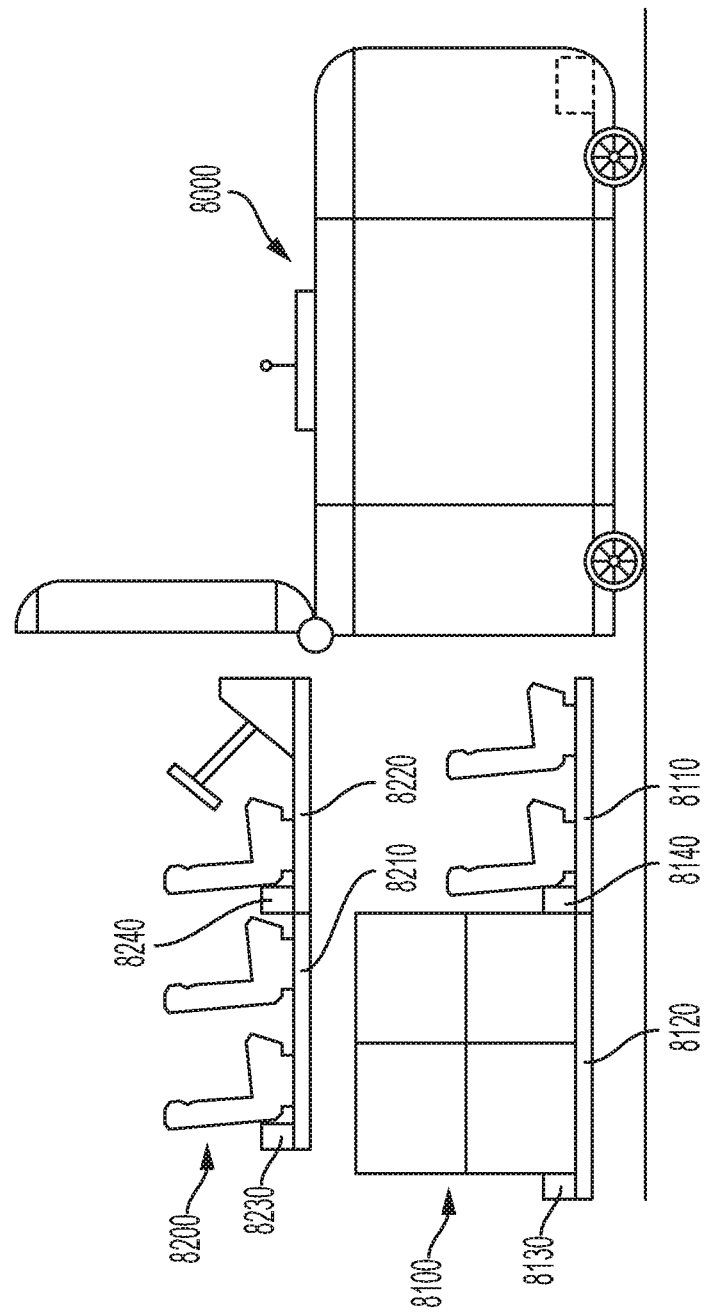
FIG. 8 is a diagram of another example of a reconfigurable autonomous vehicle in accordance with embodiments of this disclosure.

FIG. 8 is a diagram of another example of a reconfigurable autonomous vehicle 8000. The design of the platforms allows for variable sizes of the platform, such that two or more platforms can be inserted into the same vehicle to support multiple use cases at the same time. As shown in FIG. 8, an example removable platform 8100 may include combining a platform for passenger transport 8110 and a platform for goods transport 8120. In another example removable platform 8200, a standard human-driven transport vehicle may be mimicked by combining a passenger transport platform 8210 with a driving platform 8220. In this latter case, the communications connection would allow the control elements (e.g. steering wheel and pedals) to directly interface with the by-wire system in the vehicle to manually drive the vehicle in a standard fashion. As shown in FIG. 8, each of the platforms 8110, 8120, 8210, and 8220 may be configured with a respective application specific connections and computing apparatuses 8130, 8140, 8230, and 8240.

FIG. 9A is a diagram of a side-view of an example of a removable interior attachment mechanism 9000 of a reconfigurable autonomous vehicle in accordance with embodiments of this disclosure. The removable interior attachment mechanism 9000 includes a fixed vehicle floor 9010. The fixed vehicle floor 9010 may be permanently fixed to the reconfigurable autonomous vehicle and configured to accommodate a removable floor (not shown). The fixed vehicle floor 9010 includes one or more rails 9020. The one or more rails 9020 may be inset (i.e., recessed) into the fixed vehicle floor 9010. In some embodiments, the one or more rails 9020 may be protruding from the surface of the fixed vehicle floor 9010. Each of the one or more rails 9020 includes a number of attachment points 9030 along the length of each rail. The attachment points 9030 may include rods, ribbing, cutouts, or any other suitable structure configured to attach the removable floor to a nearest attachment point in an adjustable fashion.

Each of the one or more rails 9020 has a width that is configured to accommodate a wheeled assembly (not shown). The attachment points 9030 are configured with a width that is less than the width of the rail. The width of the attachment points 9030 is less than the width of the wheeled assembly such that the wheels of the wheeled assembly may smoothly travel the length of each of the one or more rails 9020.

As shown in FIG. 9A, the fixed vehicle floor 9010 is configured with one or more latches 9040. The one or more latches 9040 may include any type of latch such as, for example, a deadbolt latch, a spring latch, a latchbolt, a deadlatch, a draw latch, a spring bolt lock, a slam latch, a cam lock, a Norfolk latch, a Suffolk latch, a crossbar, a cabin hook, a toggle latch, a pawl, or any combination thereof. As shown in FIG. 9A, the one or more latches 9040 may be located towards the front of the autonomous vehicle. The locations of the one or more latches 9040 may be adjusted based on the autonomous vehicle configuration. For example, some autonomous vehicle configurations may require the locations of the one or more latches 9040 to be towards the rear of the autonomous vehicle, one or more of the sides of the autonomous vehicle, or any other location within the autonomous vehicle.

FIG. 9B is a diagram of a top-view of an example of a removable interior attachment mechanism 9000 of a reconfigurable autonomous vehicle in accordance with embodiments of this disclosure. The removable interior attachment mechanism 9000 includes a fixed vehicle floor 9010. The fixed vehicle floor 9010 may be permanently fixed to the reconfigurable autonomous vehicle and configured to accommodate a removable floor (not shown). The fixed vehicle floor 9010 includes one or more rails 9020. The one or more rails 9020 may be inset into the fixed vehicle floor 9010. In some embodiments, the one or more rails 9020 may be protruding from the surface of the fixed vehicle floor 9010. Each of the one or more rails 9020 includes a number of attachment points 9030 along the length of each rail. In this view, the attachment points 9030 may not be visible, and are therefore shown in dotted lines. The attachment points 9030 may include rods, ribbing, cutouts, or any other suitable structure configured to attach the removable floor to a nearest attachment point in an adjustable fashion.

Each of the one or more rails 9020 has a width that is configured to accommodate a wheeled assembly (not shown). The attachment points 9030 are configured with a width that is less than the width of the rail. The width of the attachment points 9030 is less than the width of the wheeled assembly such that the wheels of the wheeled assembly may smoothly travel the length of each of the one or more rails 9020.

As shown in FIG. 9B, the fixed vehicle floor 9010 is configured with one or more latches 9040. In this example, the one or more latches 9040 are shown to be attached to the top surface of the fixed vehicle floor 9010. In other examples, the one or more latches 9040 may be embedded into the fixed vehicle floor 9010 such that the top surface of the fixed vehicle floor 9010 is flat. The one or more latches 9040 may include any type of latch such as, for example, a deadbolt latch, a spring latch, a latchbolt, a deadlatch, a draw latch, a spring bolt lock, a slam latch, a cam lock, a Norfolk latch, a Suffolk latch, a crossbar, a cabin hook, a toggle latch, a pawl, or any combination thereof.

The fixed vehicle floor 9010 may be configured with a connection interface 9050. The connection interface 9050 may be configured to provide power, data, compressed air, and/or hydraulics between the removable floor and the autonomous vehicle, or any combination thereof. The connection interface 9050 may be configured to receive data from the removable floor. For example, the removable floor may send an indication of its configuration to the autonomous vehicle via the connection interface 9050. The autonomous vehicle may be configured to adjust its driving behavior based on the configuration of the removable floor (i.e., passenger vs. cargo). As shown in FIG. 9B, the one or more latches 9040 and the connection interface 9050 may be located towards the front of the autonomous vehicle. The locations of the one or more latches 9040 and the connection interface 9050 may be adjusted based on the autonomous vehicle configuration. For example, some autonomous vehicle configurations may require the locations of the one or more latches 9040, the connection interface 9050, or both to be towards the rear of the autonomous vehicle, one or more of the sides of the autonomous vehicle, or any other location within the autonomous vehicle.

FIG. 9C is a diagram of a cross-sectional view along line A-A of FIG. 9A of an example of a removable interior attachment mechanism 9000 of a reconfigurable autonomous vehicle in accordance with embodiments of this disclosure. The removable interior attachment mechanism 9000 includes a fixed vehicle floor 9010. The fixed vehicle floor 9010 may be permanently fixed to the reconfigurable autonomous vehicle and configured to accommodate a removable floor (not shown). The fixed vehicle floor 9010 includes one or more rails 9020. The one or more rails 9020 may be inset into the fixed vehicle floor 9010. In some embodiments, the one or more rails 9020 may be protruding from the surface of the fixed vehicle floor 9010. Each of the one or more rails 9020 includes a number of attachment points 9030 along the length of each rail. In this view, the attachment points 9030 may not be visible, and are therefore shown in dotted lines. The attachment points 9030 may include rods, ribbing, cutouts, or any other suitable structure configured to attach the removable floor to a nearest attachment point in an adjustable fashion.

Each of the one or more rails 9020 has a width that is configured to accommodate a wheeled assembly (not shown). The attachment points 9030 are configured with a width that is less than the width of the rail. 9020 The width of the attachment points 9030 is less than the width of the wheeled assembly such that the wheels of the wheeled assembly may smoothly travel the length of each of the one or more rails 9020.

FIG. 10A is a diagram of a cross-sectional side-view of an example of a removable interior attachment system 10000 of a reconfigurable autonomous vehicle in an unlocked position in accordance with embodiments of this disclosure. FIG. 10B is a diagram of a cross-sectional side-view of an example of a removable interior attachment mechanism of a reconfigurable autonomous vehicle in a locked position in accordance with embodiments of this disclosure.

Referring to FIGS. 10A and 10B, the removable interior attachment system 10000 includes a fixed vehicle floor 10100. An example of the fixed vehicle floor 10100 may be the fixed vehicle floor 9010 shown in FIGS. 9A-9C. The fixed vehicle floor 10100 may be permanently fixed to the reconfigurable autonomous vehicle and configured to accommodate a removable floor 10200. The fixed vehicle floor 10100 includes one or more rails 10110. The one or more rails 10110 may be inset into the fixed vehicle floor 10100. In some embodiments, the one or more rails 10110 may be protruding from the surface of the fixed vehicle floor 10100. Each of the one or more rails 10110 includes a number of attachment points 10120 along the length of each rail. The attachment points 10120 may include rods, ribbing, cutouts, or any other suitable structure configured to attach the removable floor to a nearest attachment point in an adjustable fashion.

The removable floor 10200 includes one or more rotating assemblies 10300. Each rotating assembly 10300 includes a wheel 10310 and a catch element 10320. Each wheel 10310 is configured to rotate along the floor of a respective rail to allow smooth installation and removal of the removable floor 10200. Each of the one or more rails 10110 has a width that is configured to accommodate the rotating assembly 10300. The attachment points 10120 are configured with a width that is less than the width of the rail 10110. The width of the attachment points 10120 is less than the width of the rotating assembly 10300 such that each wheel 10310 of the rotating assembly 10300 may smoothly travel the length of each of the one or more rails 10110.

Each wheel 10310 is connected to a bar element 10400 via a respective arm. Each catch element 10320 is connected to the bar element 10400 via a respective arm. In some examples, a respective arm of each catch element 10320 may be connected to a respective arm of a wheel 10310. Each respective arm of a wheel 10310, a catch element 10320, or both, may include a spring element or a hydraulic element. As shown in FIG. 10A, the rotating assemblies 10300 are attached to the bar element 10400 such that the wheel 10310 is lowered onto the fixed vehicle floor 10100 and the catch element 10320 is raised to disengage the attachment point 10120 when the bar element 10400 is pulled towards the rear of the vehicle. The rotating assemblies 10300 are attached to the bar element 10400 such that the wheel 10310 is lifted off the fixed vehicle floor 10100 and the catch element 10320 is lowered into the attachment point 10120 when the bar element 10400 is pushed towards the front of the vehicle, as shown in FIG. 10B. The catch element 10320, as shown in FIG. 10B, is configured to engage the attachment point 10120 to lock the removable floor 10200 in place. In this way, the removable floor 10200 may be rolled into the vehicle using the wheeled configuration, and then the bar element 10400 may be pushed to lift each wheel 10310 and engage each catch element 10320 with a respective attachment point 10120 of the fixed vehicle floor 10100.

When the bar element 10400 is pushed towards the front of the vehicle, an end of the bar element 10400 is configured to engage with one or more latches 10500 to provide a second secure attachment point. The one or more latches 10500 may be attached to the fixed vehicle floor 10100 or any other part of the vehicle, such as an interior wall. The one or more latches 10500 may include any type of latch such as, for example, a deadbolt latch, a spring latch, a latchbolt, a deadlatch, a draw latch, a spring bolt lock, a slam latch, a cam lock, a Norfolk latch, a Suffolk latch, a crossbar, a cabin hook, a toggle latch, a pawl, or any combination thereof. The fixed vehicle floor 10100 or any other part of the vehicle, such as an interior wall, may be configured with a connection interface 10600. The connection interface 10600 may be configured to provide power, data, compressed air, hydraulics between the removable floor and the autonomous vehicle, or any combination thereof. The connection interface 10600 may be configured to receive data from the removable floor. For example, the removable floor may send an indication of its configuration to the autonomous vehicle via the connection. The autonomous vehicle may be configured to adjust its driving behavior based on the configuration of the removable floor (i.e., passenger vs. cargo). As shown in FIGS. 10A and 10B, the one or more latches 10500 and the connection interface 10600 may be located towards the front of the autonomous vehicle. The locations of the one or more latches 10500 and the connection interface 10600 may be adjusted based on the autonomous vehicle configuration. For example, some autonomous vehicle configurations may require the locations of the one or more latches 10500, the connection interface 10600, or both to be towards the rear of the autonomous vehicle, one or more of the sides of the autonomous vehicle, or any other location within the autonomous vehicle. When the one or more latches 10500 are secured to the removable floor 10200, the connection interface 10600 is connected.

The bar element 10400 may include a rotatable joint 10700. The rotatable joint may include an attached handle to allow a user to rotate the bar element 10400 relative to a forward/backward axis such that the removable floor 10200 may be pushed into the vehicle without disengaging the wheels and engaging the catch elements. The removable floor 10200 may include one or more latches 10800. The one or more latches 10800 may be similar to the one or more latches 10500. The one or more latches 10800 are configured to allow additional removable floors to be inserted behind the removable floor 10200. The removable floor 10200 may also include a connection interface 10900. The connection interface 10900 may be similar to connection interface 10600. The connection interface 10900 is configured to connect additional removable floors behind the removable floor 10200 and provide power, data, or both.

Figure 11:
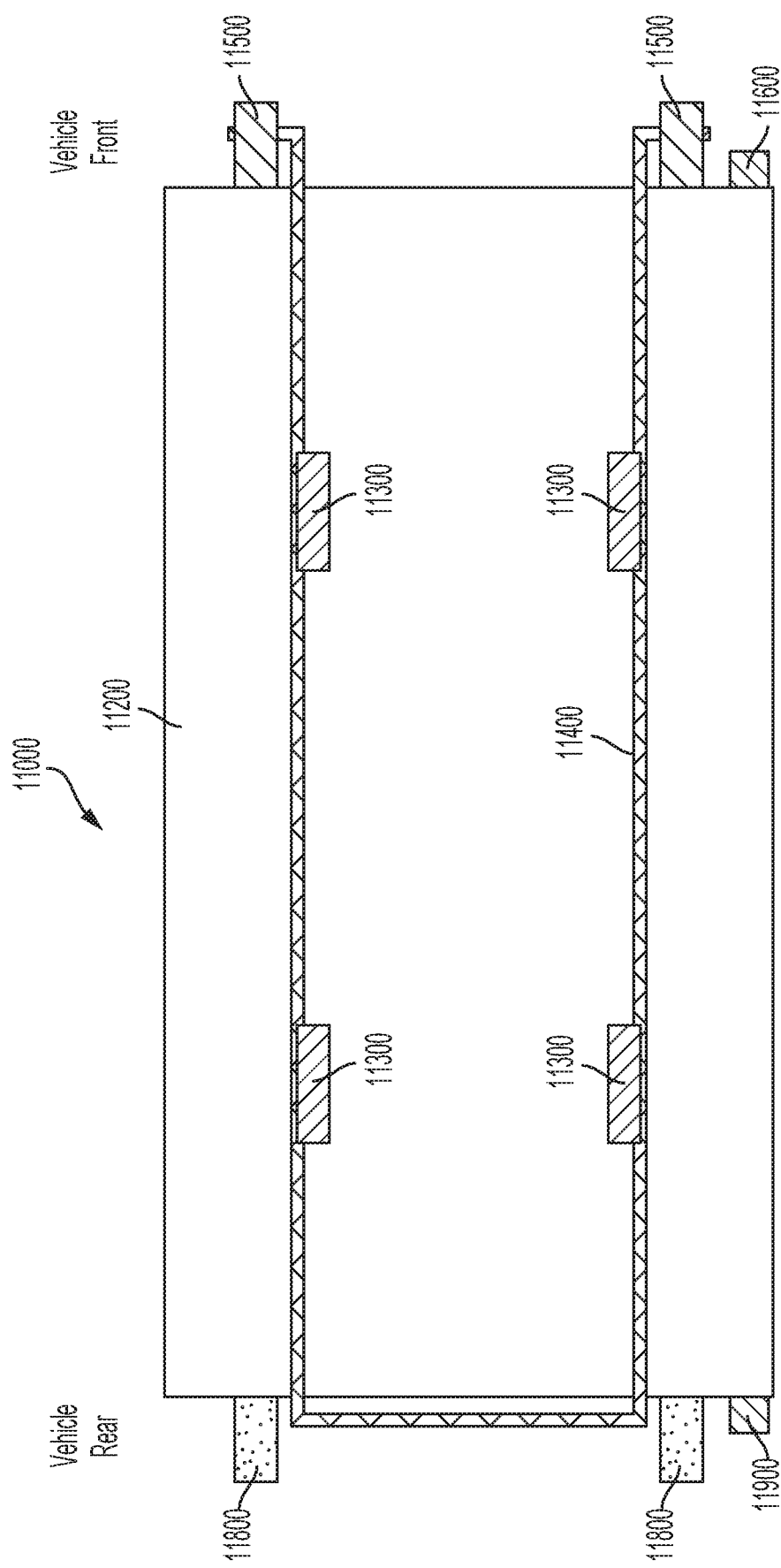
FIG. 11 is a diagram of a top-view of an example of a removable interior attachment mechanism of a reconfigurable autonomous vehicle in a locked position in accordance with embodiments of this disclosure.

FIG. 11 is a diagram of a top-view of an example of a removable interior attachment mechanism 11000 of a reconfigurable autonomous vehicle in a locked position in accordance with embodiments of this disclosure. The removable interior attachment mechanism 11000 includes a removable floor 11200. The removable floor 11200 includes one or more rotating assemblies 11300. Each rotating assembly 11300 includes a wheel (not shown) and a catch element (not shown). Each wheel is configured to rotate along the floor of a respective rail of a fixed vehicle floor to allow smooth installation and removal of the removable floor 11200.

Each rotating assembly 11300 is connected to a bar element 11400. The rotating assemblies 11300 are attached to the bar element 11400 such that the wheel is lowered onto the fixed vehicle floor and the catch element is raised to disengage an attachment point of a fixed vehicle floor when the bar element 11400 is pulled towards the rear of the vehicle. The rotating assemblies 11300 are attached to the bar element 11400 such that the wheel is lifted off the fixed vehicle floor and the catch element is lowered into the attachment point when the bar element 11400 is pushed towards the front of the vehicle. In this way, the removable floor 11200 may be rolled into the vehicle using the wheeled configuration, and then the bar element 11400 may be pushed to lift each wheel and engage each catch element with a respective attachment point of the fixed vehicle floor.

When the bar element 11400 is pushed towards the front of the vehicle, an end of the bar element 11400 is configured to engage with one or more latches 11500 to provide a second secure attachment point. The one or more latches 11500 may be attached to the fixed vehicle floor or any other part of the vehicle, such as an interior wall. The one or more latches 11500 may include any type of latch such as, for example, a deadbolt latch, a spring latch, a latchbolt, a deadlatch, a draw latch, a spring bolt lock, a slam latch, a cam lock, a Norfolk latch, a Suffolk latch, a crossbar, a cabin hook, a toggle latch, a pawl, or any combination thereof. The removable floor 11200 includes a connection interface 11600 that is configured to connect with a connection of the fixed vehicle floor or any other part of the vehicle, such as an interior wall. The connection interface 11600 may be configured to provide power, data, compressed air, hydraulics between the removable floor 11200 and the autonomous vehicle, or any combination thereof. For example, the removable floor 11200 may send an indication of its configuration to the autonomous vehicle via the connection interface 11600. The autonomous vehicle may be configured to adjust its driving behavior based on the configuration of the removable floor 11200 (i.e., passenger vs. cargo). As shown in FIG. 11, the one or more latches 11500 and the connection interface 11600 may be located towards the front of the autonomous vehicle. The locations of the one or more latches 11500 and the connection interface 11600 may be adjusted based on the autonomous vehicle configuration. For example, some autonomous vehicle configurations may require the locations of the one or more latches 11500, the connection interface 11600, or both to be towards the rear of the autonomous vehicle, one or more of the sides of the autonomous vehicle, or any other location within the autonomous vehicle. When the one or more latches 11500 are secured to the removable floor 11200, the connection interface 11600 is connected.

The bar element 11400 may be configured in a "U-shape" as shown in FIG. 11 to allow for additional removable floors to be inserted while preventing the additional removable floor from interfering with the bar element 11400. The removable floor 11200 may include one or more latches 11800. The one or more latches 11800 may be similar to the one or more latches 11500. The one or more latches 11800 are configured to allow additional removable floors to be inserted behind the removable floor 11200. The removable floor 11200 may also include a connection interface 11900. The connection interface 11900 may be similar to connection interface 11600. The connection interface 11900 is configured to connect additional removable floors behind the removable floor 10200 and provide power, data, or both.

Figure 12:
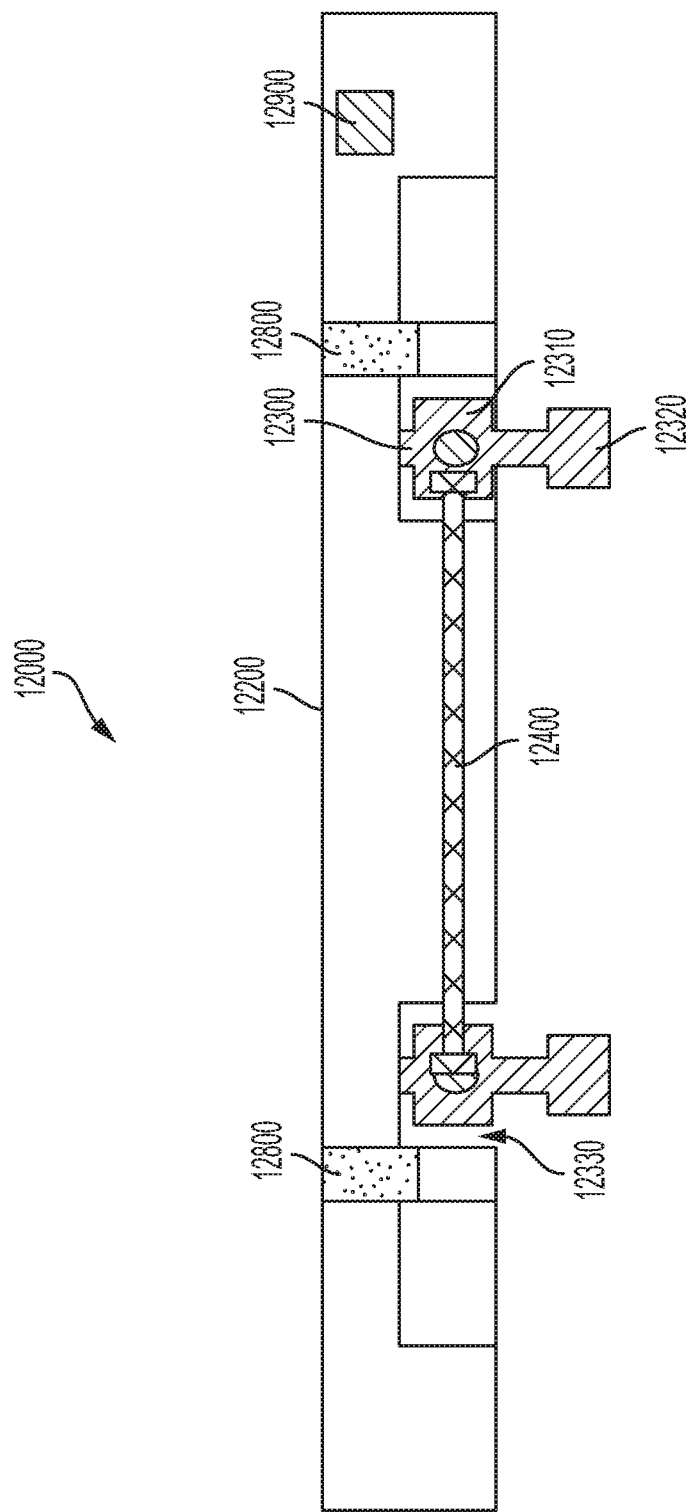
FIG. 12 is a diagram of a rear-view of an example of a removable interior attachment mechanism of a reconfigurable autonomous vehicle in a locked position in accordance with embodiments of this disclosure.

FIG. 12 is a diagram of a rear-view of an example of a removable interior attachment mechanism 12000 of a reconfigurable autonomous vehicle in a locked position in accordance with embodiments of this disclosure. The removable interior attachment mechanism 12000 includes a removable floor 12200. The removable floor 12200 includes one or more rotating assemblies 12300. Each rotating assembly 12300 includes a wheel 12310 and a catch element 12320. The width of each wheel 12310 may be less than the width of each respective catch element 12320. Each wheel 12310 is configured to rotate along the floor of a respective rail of a fixed vehicle floor (not shown) to allow smooth installation and removal of the removable floor 12200. The removable floor 12200 is configured with one or more cutouts 12330 that run parallel to one or more rails of the fixed vehicle floor. Each of the one or more cutouts 12330 has a width that is configured to accommodate the rotating assembly 12300. The width of each of the one or more cutouts 12330 is greater than the width of the rotating assembly 10300 and each wheel 12310 of the rotating assembly 10300 along the length of each of the one or more cutouts 12330.

Each wheel 12310 is connected to a bar element 12400 via a respective arm. Each catch element 12320 is connected to the bar element 12400 via a respective arm. In some examples, a respective arm of each catch element 12320 may be connected to a respective arm of a wheel 12310. Each respective arm of a wheel 12310, a catch element 12320, or both, may include a spring element or a hydraulic element. As shown in FIG. 12, the rotating assemblies 12300 are attached to the bar element 12400 such that the wheel 12310 is lowered onto the fixed vehicle floor and the catch element 12320 is raised into the cutout 12330 to disengage the attachment point of the fixed vehicle floor when the bar element 12400 is pulled towards the rear of the vehicle. The rotating assemblies 12300 are attached to the bar element 12400 such that the wheel 12310 is lifted off the fixed vehicle floor into the cutout 12330, and the catch element 12320 is lowered into the attachment point of the fixed vehicle floor when the bar element 12400 is pushed towards the front of the vehicle. The catch element 12320 is configured to engage the attachment point of the fixed vehicle floor to lock the removable floor 12200 in place. In this way, the removable floor 12200 may be rolled into the vehicle using the wheeled configuration, and then the bar element 12400 may be pushed to lift each wheel 12310 and engage each catch element 12320 with a respective attachment point of the fixed vehicle floor.

As shown in FIG. 12, the removable floor 12200 may be configured to allow for additional removable floors to be inserted into the vehicle and attached to the removable floor

12200. The removable floor 12200 may include one or more latches 12800. The one or more latches 12800 may include any type of latch such as, for example, a deadbolt latch, a spring latch, a latchbolt, a deadlatch, a draw latch, a spring bolt lock, a slam latch, a cam lock, a Norfolk latch, a Suffolk latch, a crossbar, a cabin hook, a toggle latch, a pawl, or any combination thereof. The one or more latches 12800 are configured to allow additional removable floors to be inserted behind the removable floor 12200. The removable floor 12200 may also include a connection interface 12900. The connection interface 12900 is configured to connect additional removable floors behind the removable floor 12200 and provide power, data, or both. The removable floor 12200 may also include one or more cutouts 12910. The one or more cutouts 12910 may be configured to accommodate a lifting device, for example a forklift, to aid in moving, inserting, and removing the removable floor 12200 from the vehicle.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A reconfigurable vehicle comprising:
   a vehicle frame body, wherein the vehicle frame body comprises a fixed vehicle floor and a first connection interface, wherein the fixed vehicle floor comprises a rail and a plurality of attachment points; and
   a removable floor that is configurable based on a use case for the reconfigurable vehicle, the removable floor comprising:
      a rotating assembly comprising a wheel and a catch element,
      a second connection interface configured to connect to the first connection interface, and
      a plurality of latches.

2. The reconfigurable vehicle of claim 1, wherein the removable floor is configured for passenger transport.

3. The reconfigurable vehicle of claim 1, wherein the removable floor is configured for goods transport.

4. The reconfigurable vehicle of claim 1, wherein the removable floor comprise a first portion configured for passenger transport and a second portion configured for goods transport.

5. The reconfigurable vehicle of claim 1, wherein the vehicle frame body comprises vehicle sensing configured for autonomous operation.

6. The reconfigurable vehicle of claim 1, wherein the vehicle frame body comprises hardware systems configured for autonomous operation.

7. The reconfigurable vehicle of claim 1, wherein the rail and the plurality of attachment points are recessed into the fixed vehicle floor.

8. The reconfigurable vehicle of claim 1, wherein a width of the wheel is larger than a width of an attachment point of the plurality of attachment points.

9. The reconfigurable vehicle of claim 8, wherein the wheel is configured to roll on a floor of the rail and over the attachment point.

10. The reconfigurable vehicle of claim 1, wherein the catch element is configured to engage one of the plurality of attachment points to lock the removable floor in place.

11. The reconfigurable vehicle of claim 10, wherein the wheel is configured to lift off a floor of the rail as the catch element engages one of the plurality of attachment points.

12. The reconfigurable vehicle of claim 1, wherein the first connection interface is configured to supply power to the removable floor.

13. The reconfigurable vehicle of claim 1, wherein the first connection interface is a data interface.

14. The reconfigurable vehicle of claim 1, wherein the second connection interface is configured to receive power from the first connection interface.

15. The reconfigurable vehicle of claim 1, wherein the second connection interface is configured to send data to the first interface.

16. The reconfigurable vehicle of claim 1, wherein the removable floor further comprises a third connection interface.

17. The reconfigurable vehicle of claim 16, wherein the third connection interface is configured to supply power to another removable floor.

18. A removable floor comprising:
   a rotating assembly comprising a wheel and a catch element;
   a first connection interface configured to connect to a connection interface of a vehicle; and
   a second connection interface configured to connect to another removable floor.

19. The removable floor of claim 18 further comprising:
   a bar element configured to raise and lower the wheel and the catch element.

20. The removable floor of claim 18 further comprising:
   a cutout configured to accommodate a lifting device.

* * * * *